United States Patent
Park et al.

(10) Patent No.: US 9,106,092 B2
(45) Date of Patent: Aug. 11, 2015

(54) APPARATUS FOR DISCHARGING DC-LINK CAPACITOR FOR ELECTRIC VEHICLE CHARGER

(71) Applicant: LSIS CO., LTD., Anyang-si, Gyeonggi-do (KR)

(72) Inventors: Chan Gi Park, Yangpyeong-gun (KR); Jae Ho Lee, Bucheon-si (KR); Ho Sang Jin, Ansan-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 317 days.

(21) Appl. No.: 13/753,330

(22) Filed: Jan. 29, 2013

(65) Prior Publication Data

US 2013/0193922 A1 Aug. 1, 2013

(30) Foreign Application Priority Data

Jan. 30, 2012 (KR) ........................ 10-2012-0008849

(51) Int. Cl.
*H02J 7/02* (2006.01)
*B60L 3/00* (2006.01)

(52) U.S. Cl.
CPC .... *H02J 7/02* (2013.01); *B60L 3/00* (2013.01)

(58) Field of Classification Search
USPC ........................................................ 320/109
See application file for complete search history.

(56) References Cited

U.S. PATENT DOCUMENTS

| | | | | |
|---|---|---|---|---|
| 5,631,811 A | * | 5/1997 | Huh | 363/21.04 |
| 6,369,552 B2 | * | 4/2002 | Goyhenetche et al. | 323/266 |
| 6,975,523 B2 | * | 12/2005 | Kim et al. | 363/56.11 |
| 8,699,241 B2 | * | 4/2014 | Ryu et al. | 363/21.12 |
| 2013/0088196 A1 | * | 4/2013 | Chen et al. | 320/109 |

FOREIGN PATENT DOCUMENTS

| | | |
|---|---|---|
| CN | 1906835 | 1/2007 |
| CN | 102097850 | 6/2011 |
| CN | 102237691 | 11/2011 |
| JP | 55004680 | 1/1980 |
| JP | 10326128 | 12/1998 |
| JP | 2011160649 | 8/2011 |
| JP | 2013085442 | 5/2013 |

OTHER PUBLICATIONS

Japan Patent Office Application Serial No. 2013-015499, Office Action dated Jan. 28, 2014, 4 pages.
The State Intellectual Property Office of the People's Republic of China Application Serial No. 201310037512.0, Office Action dated Aug. 5, 2014, 8 pages.

* cited by examiner

*Primary Examiner* — Sun Lin
(74) *Attorney, Agent, or Firm* — Lee, Hong, Degerman, Kang & Waimey

(57) ABSTRACT

The present invention provides an apparatus for charging a high voltage battery of an electric vehicle by performing a control operation when the apparatus operates abnormally, the control operation discontinuing operations of a rectifier, a boost PFC (Power Factor Control) circuit and a DC-DC converter and receiving a power source from an auxiliary power supply unit, the power source charged by discharging a DC-link capacitor.

5 Claims, 1 Drawing Sheet

APPARATUS FOR DISCHARGING DC-LINK CAPACITOR FOR ELECTRIC VEHICLE CHARGER

Pursuant to 35 U.S.C.§119 (a), this application claims the benefit of earlier filing date and right of priority to Korean Patent Application No. 10-2012-0008849, filed on Jan. 30, 2012, the contents of which are hereby incorporated by reference herein in their entirety.

BACKGROUND OF THE DISCLOSURE

1. Field of the Disclosure

The present disclosure relates to an apparatus for discharging DC-link capacitor for electric vehicle charger.

2. Discussion of the Related Art

This section provides background information related to the present disclosure which is not necessarily prior art.

Generally, an electronic device, like an electric vehicle charger, mounted with a boost PFC (Power Factor Control) circuit for power factor correction requires a measure to initially discharge a high voltage charged in a capacitor of an output terminal of the boost PFC circuit.

In a case abnormalcy is generated during operation of an electric vehicle charger in the prior art, a high voltage charged at the output terminal of the boost PFC circuit is maintained without any interruption to wait for several minutes up to scores of minutes until the charged voltage is discharged, or a separate discharge circuit is provided to allow the charged voltage to be discharged. As a result, an extra cost for the waiting period of time is inevitably generated, or an extra cost for configuring an additional element is unnecessarily generated.

Thus, the present disclosure is to propose a more stable and cost-efficient device for discharging a voltage charged in a DC-link capacitor of an output terminal of the boost PFC circuit.

SUMMARY OF THE DISCLOSURE

This section provides a general summary of the disclosure, and is not a comprehensive disclosure of its full scope or all of its features.

The present disclosure provides a more stable and cost-efficient device for discharging a voltage charged in a DC-link capacitor of an output terminal of the boost PFC circuit.

It should be emphasized, however, that the present disclosure is not limited to a particular disclosure, as explained above. It should be understood that other technical subjects not mentioned herein may be appreciated by those skilled in the art.

In one general aspect of the present disclosure, there is provided an apparatus for charging a high voltage battery by converting an AC power source to a DC power source for electric vehicle, the apparatus comprising: a rectifier configured to receive the AC power source and convert the AC power source to a DC power source; a boost PFC (Power Factor Control) circuit configured to correct a power factor by receiving a rectified DC power source; a DC-link capacitor configured to be charged by being connected to an output of the boost PFC circuit; a DC-DC converter configured to charge the high voltage battery by converting a voltage charged in the DC-link capacitor; a controller configured to control the rectifier, the boost PFC circuit and the DC-DC converter; and an auxiliary power supply unit configured to supply a power source to the controller by being connected to an output terminal of the DC-link capacitor and converting the voltage charged in the DC-link capacitor.

Preferably, but not necessarily, the auxiliary power supply unit may include an SMPS (Switching Mode Power Supply).

Preferably, but not necessarily, the auxiliary power supply unit may be electrically connected to both ends of the DC-link capacitor.

Preferably, but not necessarily, the controller may be further configured to: discontinue operations of the rectifier, the boost PFC circuit and the DC-DC converter, and receive the voltage charged in the DC-link capacitor in a case the apparatus operates abnormally.

Preferably, but not necessarily, the auxiliary power supply unit may be further configured to convert the voltage charged in the DC-link capacitor and provide a converted voltage to the controller, in a case the apparatus operates abnormally.

Preferably, but not necessarily, the controller may be further configured to receive a power source from a low voltage battery connected to the controller before the DC-link capacitor is fully charged, and receive a power source from the auxiliary power supply unit in a case the DC-link capacitor is fully charged.

The present disclosure has an advantageous effect in that a discharge loop of a DC-link capacitor is formed to obtain an electric stability in an emergency without assistance of an additional circuit, in a case a large capacity boost PFC circuit develops an abnormal operation such as a protective circuit operation or an emergent accident, all the operations of switching elements temporarily stop, and a high voltage of approximately 400 Vdc is applied to the DC-link capacitor connected to an output terminal of the boost PFC circuit.

BRIEF DESCRIPTION OF THE DRAWINGS

In order to explain the principle of the present disclosure, some accompanying drawings related to its preferred embodiments are below reported for the purpose of illustration, exemplification and description, although they are not intended to be exhaustive. The drawing figures depict one or more exemplary embodiments in accord with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which.

DETAILED DESCRIPTION

Figure 1:
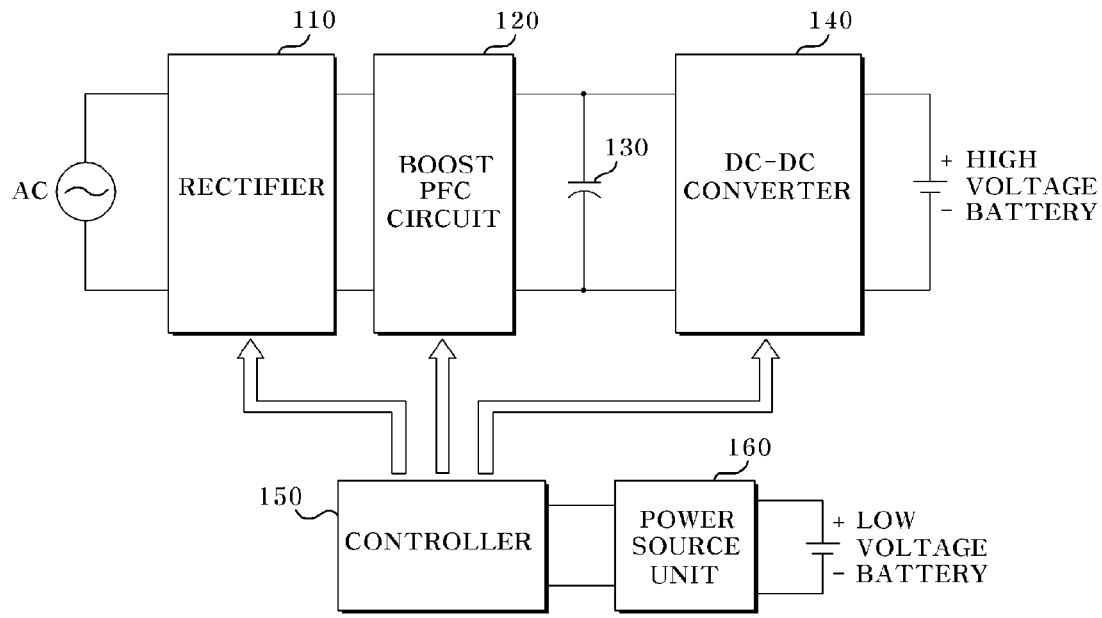
FIG. 1 is a configuration illustrating an apparatus for discharging an electric vehicle according to prior art.

In describing the present disclosure, detailed descriptions of constructions or processes known in the art may be omitted to avoid obscuring appreciation of the invention by a person of ordinary skill in the art with unnecessary detail regarding such known constructions and functions. That is, in the drawings, the size and relative sizes of layers, regions and/or other elements may be exaggerated or reduced for clarity. Like numbers refer to like elements throughout and explanations that duplicate one another will be omitted.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Hereinafter, exemplary embodiments of the present disclosure will be described in detail with reference to the accompanying drawings.

FIG. 1 is a configuration illustrating an apparatus for charging an electric vehicle according to prior art.

The apparatus for charging an electric vehicle (hereinafter referred to as "charging apparatus") according to prior art includes power converting units (110, 120, 130, 140), a controller (150) controlling the power converting units (110, 120, 130, 140) and a power supply unit (160) supplying a power source to the controller (150) and a low voltage battery. Arrows in FIG. 1 indicate that the controller (150) controls a rectifier (110), a boost PFC circuit (120) and a DC-DC converter (140).

The controller (150) receives from the power supply unit (160) a power source for operation. The power supply unit (160) can switch or regulate the power source supplied from a low voltage battery, and the switched or regulated power is provided to the controller (150).

Meanwhile, the controller (150) can perform a circuit protection operation to turn off all the elements in the power converting units in a case the charging apparatus or the power supply units of the charging apparatus operate abnormally. In this case, the DC-link capacitor (130) connected to an output terminal of the boost PFC circuit (120) is charged with a power source of high voltage. Thus, in order for the power converting units to operate normally, the power converting units must wait until the high voltage at both distal ends of the DC-link capacitor (130) is fully discharged. Furthermore, there is a fear of generating a safety accident including electrocution if the power source of high voltage is maintained at both distal ends of the DC-link capacitor (130).

Figure 2:
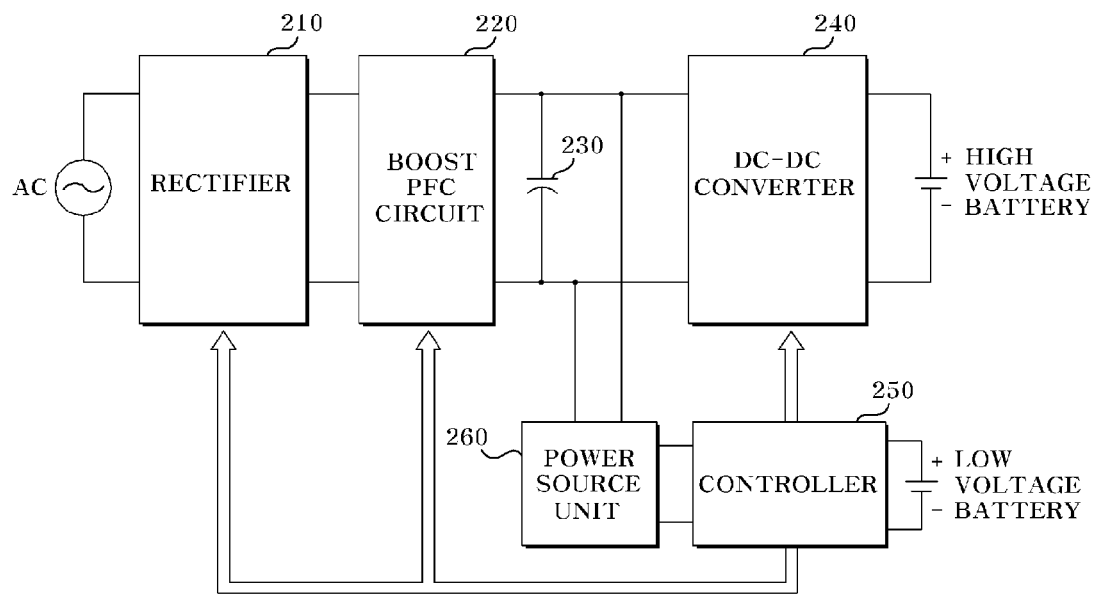
FIG. 2 is a configuration illustrating an apparatus for discharging an electric vehicle according to an exemplary embodiment of the present disclosure.

FIG. 2 is a configuration illustrating an apparatus for charging (hereinafter referred to as "charging apparatus") an electric vehicle according to an exemplary embodiment of the present disclosure.

The charging apparatus is an apparatus for charging a high voltage battery by converting an inputted AC power source to a DC power source. The apparatus thus may include a rectifier (210) receiving an AC power source and converting the AC power source to a DC power source; a boost PFC (Power Factor Control) circuit (220) correcting a power factor by receiving the rectified DC power source; a DC-link capacitor (230) charging a voltage by being connected to an output of the boost PFC circuit (220); a DC-DC converter (240) charging the high voltage battery by converting a voltage charged in the DC-link capacitor (230).

Furthermore, the charging apparatus according to an exemplary embodiment of the present disclosure may further include a controller (250) controlling the rectifier (210), the boost PFC circuit (220) and the DC-DC converter (230), and an auxiliary power supply unit (260) supplying a power source to the controller (250) by being connected to an output terminal of the DC-link capacitor (230) and converting the power source charged in the DC-link capacitor (230).

The controller (250) of the charging apparatus according to an exemplary embodiment of the present disclosure may use a low voltage battery as a main power source, and use the auxiliary power supply unit (260) as an auxiliary power source. That is, in a case the charging apparatus operates normally, the controller (250) may receive a power source from the low voltage battery, and in a case the charging apparatus operates abnormally, the controller (250) may receive the high voltage charged in the DC-link capacitor (230) as its operating power source. At this time, the auxiliary power supply unit (260) may be an SMPS (Switching Mode Power Supply), for example.

Furthermore, in a case the charging apparatus is in an initial operating stage, the controller (250) may receive a power source from the low voltage battery, and in a case the charging apparatus passes the initial operating state or operates abnormally, the controller (250) may receive the high voltage charged in the DC-link capacitor (230) as its operating power source.

Now, operation of the charging apparatus according to an exemplary embodiment of the present disclosure will be described in more detail.

The controller (250) according to an exemplary embodiment of the present disclosure may use a voltage at both distal ends of the DC-link capacitor (230) connected to an output terminal of the boost PFC circuit (220) as its operating power source. That is, the controller (250) may receive the power source from the auxiliary power supply unit (260) connected to both distal ends of the DC-link capacitor (230).

Meanwhile, the voltage at both distal ends of the DC-link capacitor (230) needs a predetermined period of time for being fully charged, such that the controller (250) at the initial operating stage of the charging apparatus may receive an operating power from the low voltage battery. Furthermore, there is an advantage of extending the life of the low voltage battery, if the low voltage battery is used only at the initial operating stage.

Thereafter, in a case the voltage at the both distal ends of the DC-link capacitor (230) is fully charged (i.e., if the apparatus is out of the initial operating stage), the controller (250) may receive the power source from the auxiliary power supply unit (260). The auxiliary power supply unit (260) receives the power source charged at the both distal ends of the DC-link capacitor (230), and provides the power source to the controller (250) by switching or regulating the power source.

In a case the charging apparatus operates abnormally, or develops an erroneous operation, the controller (250) may discontinue the operation of the charging apparatus. That is, the controller (250) may stop the operations of the rectifier (210), the boost PFC circuit (220) and the DC-DC converter (240).

In a case the charging operation of the apparatus is stopped, there may be a charged voltage of approximately 400 Vdc at the distal ends of the DC-link capacitor (230). According to the prior art, the high voltage charged at the distal ends of the DC-link capacitor (230) may cause a safety accident such as electrocution and the like.

However, the both distal ends of the DC-link capacitor (230) according to the exemplary embodiment of the present disclosure are also connected to the auxiliary power supply unit (260), such that the high voltage at the both distal ends of the DC-link capacitor (230) may be completely discharged within a few seconds in response to the voltage conversion operation of the auxiliary power supply unit (260).

To this end, the charging apparatus according to the exemplary embodiment of the present disclosure can quickly discharge the high voltage at the distal ends of the DC-link capacitor (230), even if there is generated an erroneous operation or an abnormal operation, whereby possibility of causing a safety accident can be minimized.

Although the present disclosure has been described with reference to a number of illustrative embodiments thereof, it should be understood that numerous other modifications and embodiments can be devised by those skilled in the art that will fall within the spirit and scope of the principles of this disclosure.

What is claimed is:

1. An apparatus for charging a high voltage battery of an electric vehicle by converting an AC power source to a DC power source, the apparatus comprising:
   a rectifier configured to receive the AC power source and convert the AC power source to a rectified DC power source;
   a boost PFC (Power Factor Control) circuit configured to correct a power factor by receiving the rectified DC power source;
   a DC-link capacitor configured to be charged when connected to an output of the boost PFC circuit;
   a DC-DC converter configured to charge the high voltage battery by converting a voltage charged in the DC-link capacitor;
   a controller configured to control the rectifier, the boost PFC circuit and the DC-DC converter; and
   an auxiliary power supply unit connected to the DC-link capacitor and configured to supply a power source to the controller when the apparatus operates abnormally, the power source supplied by:
   discharging a voltage charged in the DC-link capacitor;
   converting the discharged voltage; and
   providing the converted voltage to the controller.

2. The apparatus of claim 1, wherein the auxiliary power supply unit includes an SMPS (Switching Mode Power Supply).

3. The apparatus of claim 1, wherein the auxiliary power supply unit is electrically connected to both ends of the DC-link capacitor.

4. The apparatus of claim 1, wherein the controller is further configured to:
   discontinue operations of the rectifier, the boost PFC circuit and the DC-DC converter when the apparatus operates abnormally.

5. The apparatus of claim 1, wherein the controller is further configured to:
   receive a power source from a low voltage battery connected to the controller before the DC-link capacitor is fully charged; and
   receive the power source from the auxiliary power supply unit when the DC-link capacitor is fully charged.

* * * * *